Patented Jan. 12, 1932

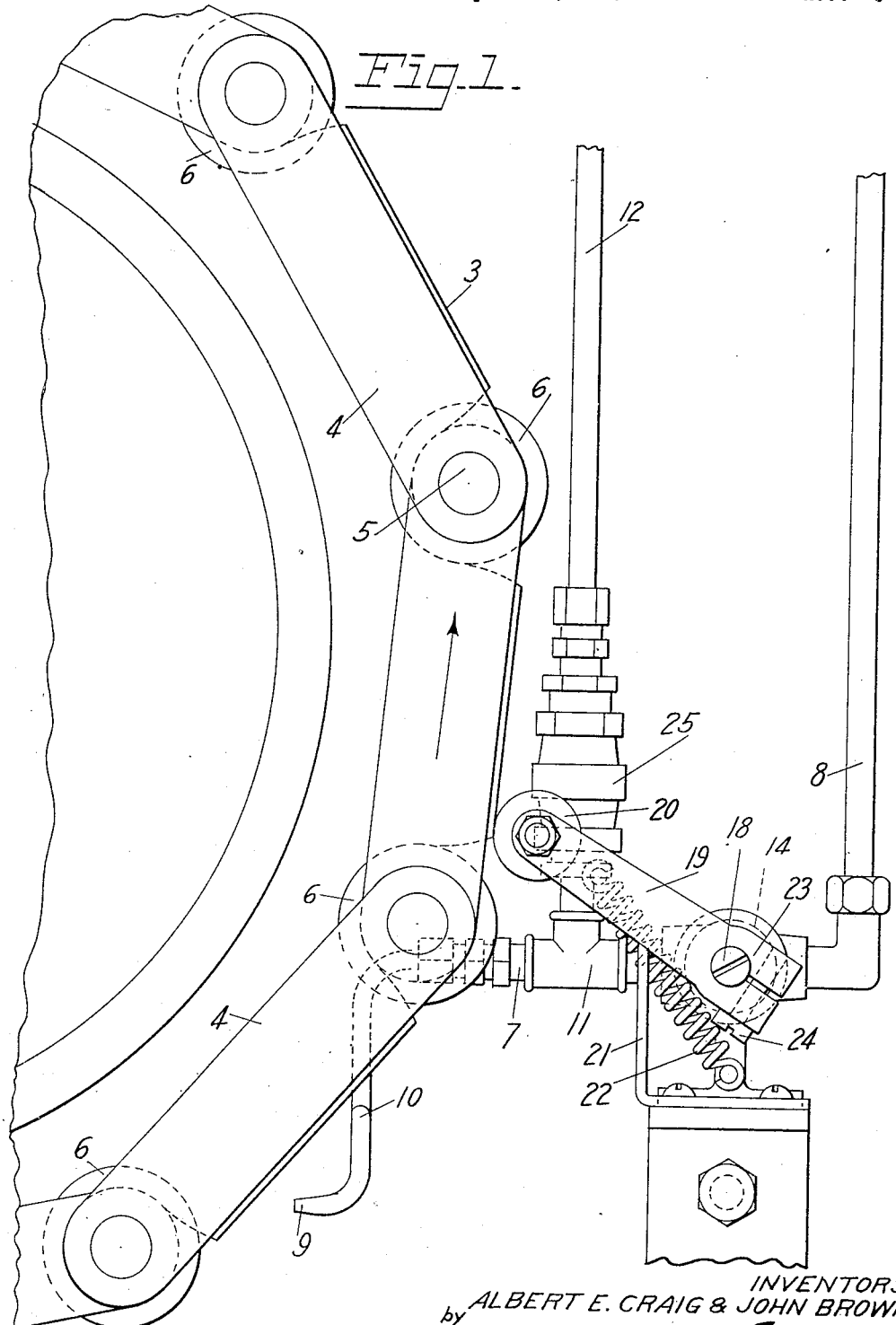

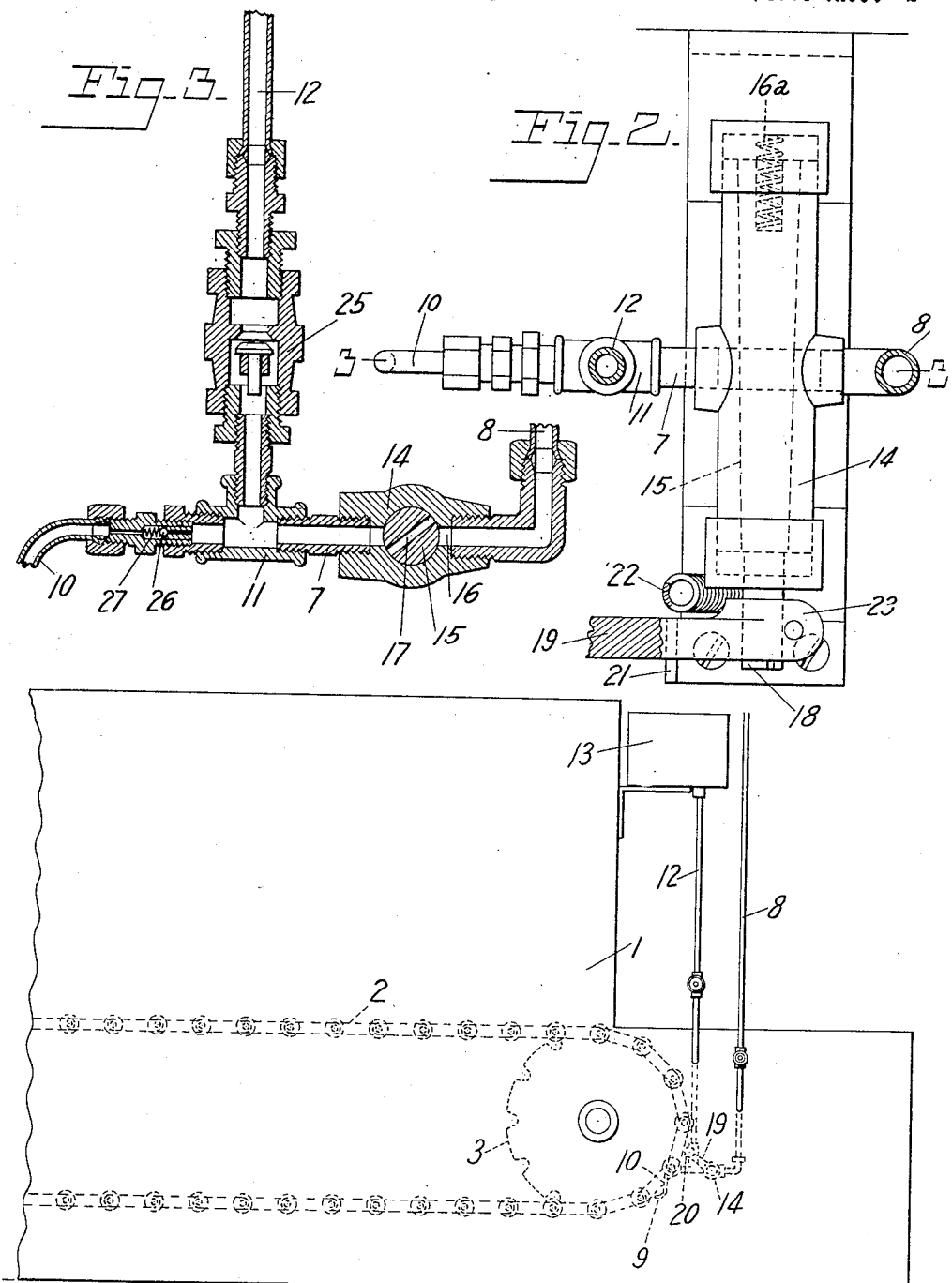

1,840,934

UNITED STATES PATENT OFFICE

ALBERT E. CRAIG AND JOHN BROWN, OF DAYTON, OHIO

LUBRICATING DEVICE

Application filed April 18, 1929. Serial No. 356,222.

This invention relates to a lubricating device for traveling endless structures and is designed primarily for use in lubricating the bearings of the traveling carrier of a continuous oven. Ovens of this type, as commonly installed are not provided with lubricating means and it is necessary to manually lubricate the bearings of the carrier by means of an oil can or brush, which is a slow tedious operation and is correspondingly expensive, and is otherwise unsatisfactory.

One object of the present invention is to provide a device for automatically and positively lubricating the bearings of a traveling endless structure while that structure is in motion.

A further object of the invention is to provide a lubricating device of such a character that the lubricant may be projected against the bearing from any suitable point adjacent thereto.

A further object of the invention is to provide such a lubricating device which will also serve to displace any dust, meal or loose dirt which may have accumulated about the bearing and prevent the same from entering the bearing.

A further object of the invention is to provide such a lubricating device which will be simple in its construction and operation and which may be installed and maintained at a low cost.

Other objects of the invention will appear as the apparatus is described in detail.

In the accompanying drawings Fig. 1 is a side elevation of a lubricating apparatus embodying our invention, showing the same in operative relation to the endless carrier of a continuous oven; Fig. 2 is a plan view of the apparatus, partly in section; Fig. 3 is a vertical sectional view taken through the apparatus on the line 3—3 of Fig. 2; and Fig. 4 is a side elevation of one end of an oven showing the invention applied thereto.

In these drawings we have illustrated one embodiment of our invention and have shown the same as applied to the endless carrier of a continuous oven, but it will be understood that this particular embodiment has been chosen for the purpose of illustration only, and that the lubricating apparatus may take various forms and may be used in connection with traveling structures of various kinds.

As shown in Fig. 4 the oven comprises a housing 1 in which is mounted an endless carrier 2 comprising a series of transverse members 3 arranged edge to edge and each having at each end thereof a link 4, the links of adjacent transverse members being pivotally connected one to the other. In the present instance, the overlapping ends of adjacent links are provided with bearings to receive a pivot pin 5 which preferably extends for the full width of the carrier and serves to connect the corresponding links on both sides thereof. Mounted on the pivot pins adjacent to each side of the carrier are rollers 6 which travel on tracks, not shown, to support the intermediate portion of the carrier. The carrer extends about and is supported by sprocket wheels or drums in the usual manner.

In applying the invention to an oven of the kind described an air line or conduit for air under pressure is extended to a point near the carrier and provided with a nozzle so arranged that the several bearings will be moved successively into line with the discharge end of the nozzle as the endless structure travels in its normal operation. A valve is provided for controlling the flow of air to the nozzle and means are also provided for introducing oil or other lubricant into the air line between the valve and the nozzle so that when the valve is open the air under pressure will be discharged through the nozzle and will carry the oil with it, thus causing a jet of oil and air to be discharged against the bearing, and not only lubricating the bearing but also displacing any dirt or dust which may have accumulated about the same. The air valve is controlled in accordance with the movement of the traveling structure so that it will be opened when a bearing is in line with the discharge end of the nozzle, will be held open long enough to permit of the proper lubrication of the bearing and will then be closed. In the case of the endless carrier of a continuous oven, and other like structures, it is important that the lubricating device shall be of such a character that it can be located beyond the end of the traveling structure, and by utilizing air under pressure for the purpose of projecting the oil against the bearing we are enabled to locate the nozzle at any desired point with relation to the bearing.

In the particular embodiment of the invention here illustrated the lubricating device comprises a tubular structure or conduit 7 connected at one end, by means of a pipe 8, with a source of supply of air under pressure, not here shown. At its other end the tubular structure or conduit is connected with a nozzle 9. In the present instance, a tube 10 is connected with the end of the tubular structure 7 and has its outer end shaped to form the nozzle 9. Preferably this tube is flexible, such as copper tubing, and may be bent to locate the discharge end of the nozzle in the desired position. The tubular structure or conduit 7 has a part forming an oil chamber, this part in the present instance being in the form of a T-coupling 11 interposed in the conduit between the ends thereof. Connected with the lateral branch of the T-coupling, which as here shown extends upwardly, is an oil pipe 12 which leads to a point outside of the housing 1 and is connected with a source of oil supply, such as an elevated tank 13. The elevation of the tank may be relied upon to provide a proper feed of the oil or, if desired, a closed tank may be used and air under light pressure confined therein. Interposed between the oil chamber and the air pipe 8 is a valve for controlling the delivery of air to the oil chamber and to the nozzle. In the structure here shown this valve is of the turn plug type and comprises an elongated valve casing 14 having a tapered valve seat extending lengthwise thereof, in which is rotatably mounted a valve member or plug 15. A spring 16a acts on the larger end of the valve member to hold the same firmly against its seat. The valve casing has, substantially midway between its ends and on opposite sides thereof, ports 16 connecting the same respectively with the air line 8 and the conduit 7, and the valve member 15 has a transverse port 17 which may be moved into and out of line with the ports 16. One end of the valve member 15 projects beyond the casing, as shown at 18, and has connected therewith a suitable actuating device which is controlled by a part movable with the endless carrier to actuate the valve. In the present instance, this actuating device is in the form of an arm 19 rigidly secured to the end of the valve member or plug 15 and provided at its outer end with a contact portion, such as a roller 20, arranged to be engaged successively by the rollers 6 of the endless carrier. The arm is retained normally in a position to close the valve and, in the arrangement shown, the downward movement of the arm is limited by a fixed stop 21 so arranged that when the arm is in contact with the stop the port 17 of the rotatable valve member will be out of line with the ports 16 of the valve casing. Ordinarily the weight of the arm itself will be sufficient to retain the valve in its closed position but, if desired, a spring 22 may be connected with the arm to move the same into engagement with the stop as soon as the roller of the traveling carrier has moved past the end of the arm. The actuating device 19 is so arranged with relation to the nozzle 9 that when one of the rollers 6 of the traveling carrier contacts with the end of the actuating arm a succeeding bearing will be in line with the discharge end of the nozzle, and as the valve is opened a jet of oil and air is discharged against the last mentioned bearing. This jet of air and oil serves to displace and remove any dust or meal which may have accumulated about the bearing and to force the oil between the bearing surfaces. Preferably the actuating device is adjustable so as to permit the period of time during which the air valve remains open to be varied. This may be accomplished in various ways but, as here shown, the arm is provided at its inner end with a split socket 23 to receive the end 18 of the valve member and is clamped tightly about the end of the valve member by a screw 24. By adjusting the arm with relation to the valve member the outer end of the arm, or the roller 20, may be so positioned that it will remain in contact with the roller of the carrier for a longer or shorter time, as may be desired.

The oil line 12 leading to the oil chamber 11 has interposed therein a check valve 25 which is normally open to permit of the free flow of the oil to the oil chamber but which is so arranged that it will be closed by air pressure in the oil chamber and will thus prevent the air under pressure from forcing the oil up through the oil line and entering the oil tank 13. A second check valve 26 is interposed between the oil chamber and the nozzle 9. This check valve, 26, opens outwardly and is normally held on its seat by yieldable means, such as a spring 27, so as to prevent the escape of the oil from the oil chamber to the nozzle. The spring, however, is very light and will yield under the pressure of the air in the oil chamber and thus permit the air and oil to be discharged through the nozzle.

In the foregoing description we have described a device for lubricating bearings at one side of an endless carrier. In case of a chain or other endless structure having a single series of bearings the one lubricating device is sufficient but in devices such as the endless carrier of the continuous oven there are two series of bearings, one at each side of the carrier, and a second lubricating device, which may be identical with that here shown and described, is provided for lubricating the bearings of the second series.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a lubricating apparatus for a traveling endless structure having a plurality of bearings spaced apart lengthwise thereof, a device having a part constituting an oil chamber, means for connecting said oil chamber with a source of supply of oil, means for connecting said oil chamber with a source of supply of air under pressure and comprising a valve, a nozzle connected with said oil chamber and so arranged that said bearings will be moved successively into line with the discharge end thereof, means controlled by said traveling structure to open said valve when one of said bearings is in line with said nozzle, and a check valve arranged to normally prevent the passage of oil from said oil chamber to said nozzle and yieldable under air pressure to permit the passage of oil and air to said nozzle.

2. In a lubricating apparatus for a traveling endless structure having a plurality of bearings spaced apart lengthwise thereof, a device having a part constituting an oil chamber, means for connecting said oil chamber with a source of supply of oil, means for connecting said oil chamber with a source of supply of air under pressure and comprising a valve, a nozzle connected with said oil chamber and so arranged that said bearings will be moved successively into line with the discharge end thereof, means controlled by said traveling structure to open said valve when one of said bearings is in line with said nozzle, and a normally open check valve interposed between said oil chamber and said source of oil supply and arranged to be closed by the pressure of air in said oil chamber.

3. In a lubricating device for a traveling endless structure having a plurality of bearings spaced apart lengthwise thereof, a device having a part constituting an oil chamber, an oil supply pipe leading to said oil chamber, an inwardly opening check valve in said oil supply pipe, a nozzle connected with said oil chamber and so arranged that said bearings will be moved successively into line with the discharge end of said nozzle, a supply pipe for air under pressure connected with said oil chamber, an air valve to control the connection between said air supply pipe and said oil chamber, means controlled by said traveling structure to open said air valve when one of said bearings is in line with said nozzle, and an outwardly opening check valve interposed between said oil chamber and said nozzle and comprising yieldable means to normally close the valve but to permit the same to open under the pressure of air in said oil chamber.

4. In a lubricating apparatus for a traveling endless structure having a plurality of bearings spaced apart lengthwise thereof, a device having a part constituting an oil chamber, an oil supply pipe leading to said oil chamber, a nozzle connected with said oil chamber and so arranged that said bearings will be moved successively into line with the discharge end of said nozzle, a supply pipe for air under pressure connected with said oil chamber, means for causing air under pressure to be delivered through said air supply pipe to said oil chamber at intervals determined by the movement of said traveling structure, means to automatically close said oil supply pipe against the passage of air when air under pressure is delivered to said oil chamber, and means to normally close the connection between said oil chamber and said nozzle and to automatically open said connection when air under pressure is delivered to said oil chamber.

5. In a lubricating apparatus for a traveling endless structure having a plurality of bearings spaced apart lengthwise thereof, a device having a part constituting an oil chamber, an oil supply pipe leading to said oil chamber, a nozzle connected with said oil chamber and so arranged that said bearings will be moved successively into line with the discharge end of said nozzle, a supply pipe for air under pressure connected with said oil chamber, a normally open valve in said oil supply pipe, a normally closed valve between said oil chamber and said nozzle, and means controlled in accordance with the movement of said traveling structure to cause air under pressure to be delivered through said air supply pipe to said oil chamber, to close the valve in said oil supply pipe and to open the valve between said oil chamber and said nozzle.

6. In a lubricating apparatus for a traveling endless structure having a plurality of bearings spaced apart lengthwise thereof, a device having a part constituting an oil chamber, an oil supply pipe leading to said oil chamber, a nozzle connected with said oil chamber and so arranged that said bearings will be moved successively into line with the discharge end of said nozzle, a supply pipe for air under pressure connected with said oil chamber, means to normally interrupt the communication between said oil chamber and said nozzle, and means controlled in accordance with the movement of said traveling structure to cause air under pressure to be delivered through said air supply pipe to said oil chamber and to establish communication between said oil chamber and said nozzle.

7. In a lubricating apparatus for a traveling endless structure having a plurality of bearings spaced apart lengthwise thereof, a device having a part constituting an oil chamber, an oil supply pipe leading to said oil chamber, a nozzle connected with said oil chamber and so arranged that said bearings will be moved successively into line with the discharge end of said nozzle, a supply pipe for air under pressure connected with said oil chamber, means controlled in accordance with the movement of said traveling structure to cause air under pressure to be delivered through said air supply pipe to said oil chamber, and pressure controlled means to normally close the connection between said oil chamber and said nozzle and to open said connection when air under pressure is delivered to said oil chamber.

In testimony whereof, we affix our signatures hereto.

ALBERT E. CRAIG.
JOHN BROWN.